(12) United States Patent
Lim et al.

(10) Patent No.: US 7,292,548 B2
(45) Date of Patent: Nov. 6, 2007

(54) CELL SEARCH APPARATUS AND METHOD FOR SUPPORTING MULTISEARCH FUNCTIONS IN A MOBILE COMMUNICATION SYSTEM

(75) Inventors: Chae-Man Lim, Seoul (KR); Yong-Serk Kim, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1094 days.

(21) Appl. No.: 10/420,913

(22) Filed: Apr. 23, 2003

(65) Prior Publication Data
US 2003/0202541 A1    Oct. 30, 2003

(30) Foreign Application Priority Data
Apr. 24, 2002   (KR)  ............... 10-2002-0022579

(51) Int. Cl.
*H04Q 7/00* (2006.01)
*H04Q 7/20* (2006.01)
*H04B 7/216* (2006.01)

(52) U.S. Cl. .............. 370/328; 370/335; 370/331; 455/436

(58) Field of Classification Search ........... 370/335, 370/328, 331, 342, 350, 333, 347; 455/422.1, 455/435.2, 435.3, 436–439, 442–444
See application file for complete search history.

(56) References Cited

FOREIGN PATENT DOCUMENTS

EP    1187369    3/2002

*Primary Examiner*—Chris Kelley
*Assistant Examiner*—Xiao Qin (Vincent) Lu
(74) *Attorney, Agent, or Firm*—Roylance, Abrams, Berdo & Goodman, LLP

(57) ABSTRACT

An apparatus and method manages timings of Node Bs by performing a first-step cell search on primary synchronization channel signals transmitted from the Node Bs, and stores frame boundary indexes representing frame boundaries for the Node Bs by performing a second-step cell search on secondary synchronization channel signals received from the Node Bs. Upon receiving a third-step cell search start command, the apparatus and method compares frame boundary timing corresponding to each of the frame boundary indexes to a current timing from a reference timer, performs a third-step cell search on hypotheses corresponding to the frame boundary indexes at a next slot boundary following the current timing by using scrambling codes in a Node B code group obtained by the second-step cell search, and provides a third-step cell search complete information after completing the third-step cell search on hypotheses corresponding to the frame boundary indexes.

18 Claims, 9 Drawing Sheets

CELL SEARCH APPARATUS AND METHOD FOR SUPPORTING MULTISEARCH FUNCTIONS IN A MOBILE COMMUNICATION SYSTEM

PRIORITY

This application claims priority under 35 U.S.C. § 119 to an application entitled "Cell Search Apparatus and Method for Supporting Multisearch Function in a Mobile Communication System" filed in the Korean Industrial Property Office on Apr. 24, 2002 and assigned Serial No. 2002-22579, the contents of which are incorporated herein by reference.

BACKGROUND OF THE INVENTION

1. Field of the Invention

The present invention relates generally to a cell search apparatus and method in a mobile communication system, and in particular, to an apparatus and method for performing a multisearch operation on a plurality of cells to be searched.

2. Description of the Related Art

In general, a mobile communication system is classified into a synchronous system developed and used in the United States and an asynchronous system developed and used in Europe. With the rapid development of the mobile communication industry, there have been demands for a future mobile communication system which can provide not only a voice service but also a multimedia service including data and image services. $3^{rd}$ Generation Partnership Project (3GPP) has been standardizing both the synchronous future mobile communication system and the asynchronous future mobile communication system. The synchronous future mobile communication system is called a "code division multiple access-2000 (CDMA-2000) system," and the asynchronous future mobile communication system is called a "wideband-CDMA (W-CDMA) system." The W-CDMA mobile communication system comprises UMTS (Universal Mobile Telecommunications System) Terrestrial Radio Access Networks (UTRANs) that perform an asynchronous operation between Node Bs. Therefore, in order to identify the Node Bs, unique scrambling codes are assigned to the Node Bs. For example, if the number of cells, or Node Bs, constituting the UTRAN is 512, each of the 512 Node Bs is assigned its own unique scrambling code among 512 scrambling codes, for its identification. Since a Node B transmits a signal with a scrambling code for its identification, a user equipment (UE) must be able to identify a scrambling code for the Node B in order to normally receive a signal provided from the Node B.

That is, in order to normally receive a signal provided from a Node B, a UE must determine a scrambling code of a signal received at the highest energy among signals received from its neighboring Node Bs, and such a process of determining a scrambling code is called "cell search." The cell search is performed in various ways according to circumstances, and includes (i) initial cell search for acquiring pseudo noise (PN) code timing by a UE upon power on, (ii) multipath search for detecting a multipath signal component of a received signal for rake demodulation while continuously maintaining the acquired PN code timing, (iii) neighbor cell search for searching target neighbor cells to which the UE is to be handed off when the UE is located in a handoff region, and (iv) re-acquisition for re-acquiring PN code timing, which was lost when the UE selects a slotted mode in an idle state or wakes up from a sleep state.

In the W-CDMA mobile communication system, a UE, as stated above, must perform cell search by measuring a phase of each of all scrambling codes that are assignable to Node Bs, i.e., 512 scrambling codes, in order to determine a scrambling code for a Node B to which the UE itself belongs (hereinafter, referred to as a "source Node B"). However, such a cell search algorithm for determining phases of all scrambling codes for the Node Bs one by one requires a long cell search time. To solve this problem, a new multistep cell search algorithm has been proposed.

The multistep cell search algorithm will now be described below.

Node Bs constituting the W-CDMA mobile communication system are assigned their own unique cell identification codes, or scrambling codes, for identification of the Node Bs. A UE identifies the Node Bs with the assigned scrambling codes. It will be assumed herein that the number of cells constituting the W-CDMA mobile communication system is 512 and one cell exists in each Node B, so the number of Node Bs constituting the W-CDMA mobile communication system becomes 512. However, the Node B may employ one or more cells. In this case, the 512 Node Bs are assigned their own unique scrambling codes, and a UE identifies the Node Bs using the unique scrambling codes assigned to the Node Bs.

Currently for a cell search, in order to search a source Node B, a UE must perform a cell search on each of the 512 Node Bs constituting the W-CDMA mobile communication system. Since performing a cell search on each of the 512 Node Bs constituting the W-CDMA mobile communication system is equivalent to measuring a phase of each of all the scrambling codes for the 512 Node Bs, the UE requires a large amount of time to perform the cell search. As a result, it is inefficient to apply the existing cell search algorithm to each of the Node Bs constituting the W-CDMA mobile communication system. Therefore, the UE employs the multistep cell search algorithm. In order to realize the multistep cell search algorithm, a plurality of Node Bs, e.g., 512 Node Bs, belonging to the W-CDMA mobile communication system are divided into a predetermined number of groups, e.g., 64 groups Group#0 to Group#63. The divided 64 Node B groups are assigned their own unique group identification codes, for identification of the Node B groups. In addition, each Node B group includes 8 Node Bs, and the 8 Node Bs are assigned their own unique scrambling codes for spreading a common pilot channel (CPICH), so that the UE can search for its source Node B, using the assigned scrambling codes.

The multistep cell search algorithm includes in the first-step a search, in the second-step a cell search and in the third-step another cell search. In the first-step cell search process, a UE receives primary synchronization channel (P-SCH) signals transmitted from a Node B and acquires slot timing for a signal received at the highest power among the received P-SCH signals. In the second-step cell search process, the UE acquires slot synchronization based on the slot timing information acquired in the first-step cell search process, and then acquires frame synchronization and detects a Node B group to which the UE belongs by receiving a secondary synchronization channel (S-SCH) transmitted from the Node B. In the third-step cell search process, the UE finally searches for its source Node B using a scrambling code for the Node B by receiving a CPICH signal transmitted from the Node B based on the frame synchronization and Node B group information acquired in the second-step cell search process.

The multistep cell search will now be described with reference to FIG. 1.

FIG. 1 illustrates an example of a structure of synchronization channels in a general W-CDMA mobile communication system. Referring to FIG. 1, in the W-CDMA mobile communication system, a searcher in a UE uses a synchronization channel (SCH) and a common pilot channel (CPICH), for synchronization. Node Bs transmit the CPICH using their own unique scrambling codes. A period of the scrambling code is equal to a one-frame length. In the W-CDMA mobile communication system having the channel structure illustrated in FIG. 1, as many Gold codes (not shown) having a period of $2^{18}-1$ as a one-frame length are used as the unique scrambling codes. Only M (=512) Gold codes among all available Gold codes are used. The SCH, a downlink channel used for cell search by the UE, comprises two subchannels primary SCH (P-SCH) and secondary SCH (S-SCH). Since each time slot of the P-SCH and S-SCH comprises 2,560 chips and 15 time slots constitute one radio frame, one radio frame, therefore, comprises 38,400 chips. Further, as illustrated in FIG. 1, the P-SCH and S-SCH are transmitted by N chips, i.e., 256 chips, amounting to $\frac{1}{10}$ of the chips transmitted over one time slot, at the beginning of each time slot. In addition, as orthogonality is maintained between the P-SCH and the S-SCH, it is possible to overlap the two channels during transmission. The P-SCH, a channel over which the 512 Node Bs constituting the W-CDMA mobile communication system transmit the same code, transmits a primary synchronization code (PSC) $ac_p$. Further, the P-SCH transmits as much primary synchronization code as $\frac{1}{10}$ period, i.e., 256 chips, of a time slot at each time slot. The UE acquires the slot timing from a Node B by receiving a P-SCH signal transmitted from the Node B.

The Node B transmits an S-SCH signal along with a P-SCH signal. If the 512 Node Bs constituting the W-CDMA mobile communication system are divided into 64 Node B groups, the S-SCH transmits a secondary synchronization code (SSC) $ac_s^{i,k}$, i.e., a Node B group identification code to which the Node B belongs. The secondary synchronization code is a 15-symbol sequence having a 256-chip length. In the secondary synchronization code, $ac_s^{i,k}$, i (=0, 1, ..., 63) represents the number of Node B groups, i.e., the number of scrambling code groups, where k (=0, 1, ..., 14) represents a time slot number. Further, the secondary synchronization code is selected from 16 code groups having a 256-chip length. A sequence of the secondary synchronization code represents a code group to which a downlink scrambling code for a corresponding Node B belongs. The code group further represents a group of codes for generating the Node B group identification code. The secondary synchronization channel also transmits the secondary synchronization code using $\frac{1}{10}$ period of a time slot, i.e., using 256 chips, at each time slot. The UE detects a Node B group which is its source Node B and synchronizes with a frame boundary by receiving a secondary synchronization channel signal transmitted from the Node B.

The Node B group identification code is used to determine a group to which the Node B belongs. A comma-free code is typically used as the Node B group identification code. The comma-free code comprises 64 codewords, and each codeword comprises 15 symbols. The 15 symbols are transmitted every frame. However, as mentioned above, values of the 15 symbols are mapped to one of the secondary synchronization codes $ac_s^{i,k}$ of $ac_s^{i,0}$, $ac_s^{i,1}$, ..., $ac_s^{i,15}$ before being transmitted. That is, as illustrated in FIG. 1, an $i^{th}$ secondary synchronization code corresponding to a symbol value i is transmitted every time slot. In addition, 64 codewords of the comma-free code identify 64 code groups. The comma-free code is characterized such that the cyclic shift of each codeword is unique. Therefore, it is possible to acquire information on a code group, i.e., a Node B group, where the UE belongs, and information on frame synchronization by receiving a secondary synchronization channel signal for a period of several time slots, correlating secondary synchronization codes with a secondary channel signal for the period of several time slots, and performing a cyclic shift operation on each of the 64 codewords 15 times. The term "frame synchronization" means synchronization on timing or phase within one period of a scrambling spreading code for a spread spectrum system. In the existing W-CDMA mobile communication system, one period of a spreading code and a length of a frame are both 10 ms, so this is called "frame synchronization."

After performing the first-step cell search process and the second-step cell search process, the UE can acquire information on slot synchronization, Node B group identification code and frame synchronization through the P-SCH and S-SCH. However, since the UE cannot distinguish a scrambling code for its source Node B from 8 other Node B scrambling codes within a code group based on the acquired Node B group identification code, scrambling code synchronization is not completed achieved yet. Therefore, the UE can identify a scrambling code to be used among the 8 scrambling codes by performing correlation on each of the 8 scrambling codes belonging to the code group for the CPICH via a third-step cell search process.

The UE must periodically measure the strength of the signals transmitted from Node Bs neighboring its source Node B, in order to receive an optimal multipath signal from the Node B in a radio channel environment or a handoff situation. In this case, the UE acquires timing information of neighbor Node Bs by the multistep cell search algorithm or from the current Node B in service, receives CPICH from each of the corresponding Node Bs, and periodically performs correlation on each of the received CPICH signals. Herein, a process of periodically measuring strength of signals from Node Bs neighboring a source Node B to acquire the timing information of the neighboring Node Bs will be referred to as a "multipath search" in order to distinguish this process from the above-stated cell search process that is performed before the UE acquires timing of the neighbor Node Bs.

Generally, the UE identifies signals from Node Bs to which it may probably move, by cell search, and continuously manages the Node B signals through the multipath search. Further, the UE demodulates valid multipath signal components, i.e., valid multipath signals, among the signals received by the cell search and multipath search. In the case of the multipath search, the UE should be able to perform a high-speed search in order to promptly respond to an abrupt variation in channel conditions. The multipath search calculates correlation values for all hypotheses at stated intervals in a window and then detects a plurality of correlation values which are peak values and larger than or equal to a predetermined threshold value. Then, scrambling code timings having the detected correlation values become timings of multipath signal components.

As stated above, the W-CDMA mobile communication system acquires scrambling code synchronization while continuously performing the third-step cell search. That is, a UE acquires time slot synchronization with P-SCH in the first-step cell search process, and acquires frame synchronization and scrambling code group information, i.e., group information of its source Node B, with S-SCH in the second-step cell search process. Finally, in the third-step cell search process, the UE detects a scrambling code assigned to a corresponding Node B among the 8 scrambling codes within the determined scrambling code group by searching CPICH after the frame synchronization is achieved. In order to perform the third-step cell search process in this manner, the UE must determine reference timing for where it will start the first-step cell search process, and reference timing for where it will start the second-step cell search process after acquiring time slot synchronization as the first-step cell search process is completed. That is, in order to identify a scrambling code group and acquire frame synchronization in the second-step cell search process, the UE must determine reference timing where it will perform cyclic shift so as to determine a frame boundary from the number of cyclic shifts performed during codeword decoding. In addition, after acquiring scrambling code group information and frame synchronization information through the second-step cell search process, the UE must determine reference timing for where it will start the third-step cell search process.

However, the UE must continuously perform such a cell search process for communication with Node Bs instead of performing the search only once at the initial cell search. Therefore, in order to calculate and manage a timing difference between a frame boundary of a signal currently demodulated by a UE and a frame boundary of signals received from the same Node B or different Node Bs, that may probably be demodulated later, a specified criterion is required. That is, it must be possible to calculate a timing difference between a frame boundary of neighboring Node Bs, detected through a cell search process, and a frame boundary of other Node Bs, detected by the previous cell search. In the multipath search, a UE calculates a correlation for scrambling codes of Node Bs to which the UE may probably move, and measures the strength of signals received from the Node Bs. However, since the Node Bs have different frame boundaries, the UE must initialize scrambling codes to match phases of the scrambling codes of the Node Bs before calculating the correlation. Therefore, it is necessary to provide reference timing for initializing the scrambling codes of the Node Bs. Multipath signal components determined to be valid by the cell search and the multipath search are assigned to a modulator or finger of a UE, for demodulation. The demodulator of the UE must initialize a scrambling code of a corresponding Node B synchronized with a frame boundary of a corresponding multipath signal, and provide reference timing for initializing the scrambling code. A device for proving the reference timing is a reference counter, and the reference counter continuously performs a count operation at periods of 10 ms by managing timing by the time slot. The count unit is 1/n chips, where n is the number of oversamples.

A mask operation or a slew operation is used to currently perform search on hypotheses to be searched when performing the third-step cell search or the multipath search. However, since the W-CDMA mobile communication system is an asynchronous mobile communication system, a UE has difficulty in performing a cell search on a plurality of Node Bs while in motion, and information that the UE holds for the cell search is limited. Particularly, the UE cannot store all mask values chip by chip (or in a chip unit) within 10 ms which is a unit of managing the reference timing. In addition, when a UE is designed to usually start the third-step cell search or the multistep search at a frame boundary, the UE should always wait for a frame boundary, suffering a loss in terms of demodulation timing, i.e., search rate. That is, the multipath search increases demodulation performance by demodulating and combining signals received through multiple paths, and when the UE usually starts the multipath search at a frame boundary, a delay occurs in actual combining due to the waiting time, causing a decrease in demodulation performance. Therefore, the UE suffers a loss in terms of demodulation timing.

Therefore, in general, a central processing unit (CPU) of the UE detects current timing by reading a current index value of the reference counter, determines an actual point of time where a searcher will operate, based on the detected current timing, and then sets a mask value for a phase of a corresponding scrambling code and activates the searcher.

As described above, in the third-step cell search and the multipath search, the CPU plays a part in determining an operation point of a searcher, and activates the searcher at the determined point of time. Of course, if the CPU fixes an operation point to a specific point instead of variably determining the operation point according to circumstances, the searcher will be usually activated at the fixed specific point of time. However, when cell search is performed in a channel environment, the search rate serves as an important parameter in the signal demodulation performance. In this case, the search rate must be high so that the UE can adaptively cope with a variation in the radio channel environment. However, the search rate is determined according to a plurality of parameters, such as hardware complexity, CPU speed, and software task scheduling. Therefore, in the case where there exists N search targets, in order to reduce a software load, it is possible to write by hardware all parameters related to the N search targets at once, thereby enabling a corresponding hardware to sequentially search the N search targets. The operation of searching by hardware for a plurality of search targets in a lump will be referred to as a "multisearch operation."

In the W-CDMA mobile communication system, a counter operating in a frame unit (=10 ms), i.e., a reference counter, is used to continuously calculate a timing difference between Node Bs, i.e., a difference between frame boundaries. Herein, the reference counter will be referred to as an "index counter," since an output of the reference counter is used as reference timing for a cell searcher, a multipath searcher and a multipath signal demodulator.

The index counter continuously operates, after being initialized by a CPU upon powering a UE. If a resolution of a searcher is 1/K chip, the index counter should also have a resolution of over 1/K chip. In the 3GPP specification, a length L of one frame is L=38,400 chips, the number M of time slots constituting one frame is M=15, and a length N of one time slot is N=2,560 chips. The length L of one frame becomes a period of one frame, and the length N of one time slot becomes a period of one time slot. A resolution of the searcher represents accuracy of the search, and is used to search for a more accurate synchronization point. Therefore, the minimum unit is 1 chip. In order to detect an accurate synchronization point, it is preferable to check a plurality of hypotheses or sampling points per chip and select an optimal point among the points.

FIGS. 2 and 3 illustrate different examples of a general index counter.

Referring first to FIG. 2, an index counter 210 comprises a slot counter 212 for counting time slots constituting one frame and a lower counter 214 for counting the number, K×N−1, of chips corresponding to a length of a predetermined number of time slots. A count value by the slot counter 212 ranges from 0 to M−1, and a count value by the lower counter 214 ranges from 0 to K×N−1. As stated above, in the W-CDMA mobile communication system, one frame comprises 15 time slots. The M, in this case, becomes 15. Further, in the W-CDMA mobile communication system, one time slot comprises 2,560 chips. The N, in this case, becomes 2,560. The lower counter 214 is reset to 0, when its count value becomes K×N. The slot counter 212 increases its count value by 1, each time the lower counter 214 counts a multiple (K×N) of N, i.e., counts the number N of chips constituting one time slot. The slot counter 212 is reset to 0, when the number of time slots constituting one frame is counted, i.e., the count value becomes M.

Referring now to FIG. 3, an index counter 310 has a structure for deriving count values of a slot counter 314 and a lower counter 316, using a single counter. The slot count 314 and the lower count 316 of FIG. 3 are substantially identical in function to the slot counter 212 and the lower counter 214 of FIG. 2, although they are represented by different reference numerals. A counter 312 constituting the index counter 310 counts from 0 to J×K×L−1, where J is an integer (J=1, 2, 3, . . . ). Count values of the slot counter 314 and the lower counter 316 are derived from a value counted by the index counter 310 in accordance with Equation (1).

Slot count value=⌊(count value)/(K×N)⌋ modulo M
Lower count value=(count value) modulo (K×N)     Equation (1)

In Equation (1), ⌊x⌋ represents a maximum integer smaller than a given value "x," and "a modulo b" represents a remainder obtained by dividing "a" by "b."

Since the index counters 210 and 310 of FIGS. 2 and 3, respectively, operate at periods of a frame length, frame boundary points of all asynchronous cells (or Node Bs) are mapped to either specific count values of the slot counter 212 and the lower counter 214 in the index counter 210, or specific count values of the slot counter 314 and the lower counter 316 in the index counter 310. When the frame boundary point of the index counter 210 or 310 is defined as a reference point, a position of a frame boundary point of each asynchronous cell is called a "frame timing index" of the corresponding cell. Therefore, if a frame timing index of each cell is given, it is possible to calculate an offset between the cells. Here, the term "offset" means a difference between frame boundary points of the asynchronous cells.

In addition, it is possible to count a time slot length with the lower counter 214 or 316 of the index counters 210 and 310, respectively. Therefore, slot boundary points of all asynchronous cells can be mapped to a specific count value of the lower counter 214 or 316 in the index counters 210 and 310. When a slot boundary point of the lower counter 214 or 316 is defined as a reference point, a position of a slot boundary point of each asynchronous cell is called a "slot timing index" of the corresponding cell. Therefore, if a slot timing index of each cell is given, it is possible to calculate an offset between slot boundary points of the cells.

FIG. 4 illustrates an example of a timing relationship between an index counter and asynchronous cells. Specifically, FIG. 4 illustrates a timing relationship between two asynchronous cells Cell_A and Cell_B, by way of example. Referring to FIG. 4, an index counter's frame boundary 410, which is a reference point for determining a frame-boundary of the cells, may correspond to a count start point of the index counters 210 and 310. The slot counter 212 or 314 of the index counters 210 and 310 counts index counter's slot boundaries 412 up to M−1 after being reset to 0 at the index counter's frame boundary 410. The index counter's slot boundary 412, which is a reference point for determining slot boundaries in one frame, may correspond to a count start point of the lower counter 214 or 316 of the index counters 210 and 310. The lower counter 214 or 316 restarts counting, after being reset to 0 at the index counter's slot boundary 412.

A Cell A's slot boundary 426 is a point where the first-step cell search process is completed after the first-step cell search process is performed at a given time point T1=0. "T1=0" means that a count value of the lower counter 214 or 316 is 0. In this case, the first-step cell search process is performed at any one of the index counter's slot boundaries 412. If the Cell A's slot boundary 426 is determined, a Cell A's slot timing index 430 is determined by an offset between the Cell A's slot boundary 426 and the give time T1=0. For example, the Cell A's slot timing index 430 is determined by a count value of the lower counter 214 or 316 at the Cell A's slot boundary 426.

A Cell B's slot boundary 424 and a Cell B's slot timing index 428 are determined in the same process as used for the Cell A's slot boundary 426 and the Cell A's slot timing index 430. The Cell A's slot boundary 426 and the Cell B's slot boundary 424 correspond to one of count values 0 to NK−1, counted by the lower counter 214 or 316. An offset between the Cell A's slot boundary 426 and the Cell B's slot boundary 424 is defined as a slot offset 432. A Cell A's frame boundary 414 is determined by the number of cyclic shifts of codewords for a code group having a maximum correlation energy by performing the second-step cell search process at the Cell A's timing index 430. That is, a point spaced apart from the start point or the Cell A's slot timing index 430 of the second-step cell search process by a length of as many slots as the number x of cyclic shifts becomes the Cell A's frame boundary 414. A Cell A's frame timing index 418 is defined as a value counted by the slot counter 212 and the lower counter 214, or the slot counter 314 and the lower counter 316 at the Cell A's frame boundary 414.

A Cell B's frame boundary 416 and a Cell B's frame timing index 420 are determined using the same process that was used for the Cell A's frame boundary 414 and the Cell A's frame timing index 418. The Cell A's frame boundary 414 and the Cell B's frame boundary 416 are determined by one of count values 0 to M−1, counted by the slot counter 212 or 314, and the Cell A's slot boundary 426 or the Cell B's slot boundary 424. An offset between the Cell A's frame boundary 414 and the Cell B's frame boundary 416 is defined as a frame offset 422.

FIG. 5 illustrates an example of a cell search apparatus for a UE in a general W-CDMA mobile communication system. Referring to FIG. 5, a controller 510 controls an overall operation for cell search. Here, the controller 510 is identical in operation to the above-stated CPU. An index counter 514, having the structure illustrated in FIGS. 2 and 3, performs a counting operation stated above. A memory 512 stores a value counted by the index counter 514 in response to a save command from the exterior. The save command is divided into a lower count save command from a first-step searcher 518, a slot count save command from a second-step searcher 522, and a count save command from the controller 510. The memory 512 provides the controller 510 with the stored count value in response to the count save command from the exterior.

A first-step operation signal generator 516 generates a first-step search operation signal based on a count value provided from the index counter 514 in response to a first-step search command received from the controller 510. A first-step searcher 518 is initialized in response to an initialization command from the controller 510, and performs a first-step search operation on a received signal in response to the first-step search operation signal from the first-step operation signal generator 516. After completing the first-step search operation, the first-step searcher 518 provides the search result by the first-step search operation to the controller 510.

A second-step operation signal generator 520 generates a second-step search operation signal based on the count value provided from the index counter 514 in response to a second-step search command and a slot timing index by the first-step search operation, received from the controller 510. A second-step searcher 522 is initialized in response to an initialization command from the controller 510, and performs a second-step search operation on the received signal in response to the second-step search operation signal from the second-step operation signal generator 520. The received signal indicates a multipath signal, which is determined as a valid signal by the first-step search. After completing the second-step search operation, the second-step searcher 522 provides the search result by the second-step search operation to the controller 510. Meanwhile, the second-step searcher 522 commands the memory 512 to store a slot count value counted by the index counter 514, at a specific time point during the second-step search operation. For example, the second-step searcher 522 commands the memory 512 to store the slot count value counted by the index counter 514, at a point where the second-step search operation is started or a point where the second-step search operation is completed.

A third-step operation signal generator 524 generates a third-step search operation signal based on the count value provided from the index counter 514 in response to a third-step search command and the search result by the second-step search operation or a third-step search start point by a hypothesis for the second-step search result, received from the controller 510. A third-step searcher 526 is initialized in response to an initialization command from the controller 510, and performs a third-step search operation on the received signal in response to the third-step search operation signal from the third-step operation signal generator 524. The received signal means a multipath signal which is determined as a valid signal. After completing the third-step search operation, the third-step searcher 526 provides the search result by the third-step search operation to the controller 510. The controller 510 can determine a scrambling code for a target cell to be searched based on the search result from the third-step searcher 526.

A multipath operation signal generator 528 generates a multipath search operation signal based on the count value provided from the index counter 514 in response to a multipath search command and a multipath search start point, received from the controller 510. A multipath searcher 530 is initialized in response to an initialization command from the controller 510, and performs a multipath search operation on the received signal in response to the multipath search operation signal from the multipath operational signal generator 528. The received signal indicates a multipath signal, which is determined as a valid signal. After completing the multipath search operation, the multipath searcher 530 provides the search result by the multipath search operation to the controller 510.

A plurality of demodulation finger operation signal generators 532, 536 and 540 each generate a demodulation finger operation signal based on the count value provided from the index counter 514 in response to a finger demodulation command and a demodulation start point, received from the controller 510. The demodulation start point is a frame timing index indicating a frame boundary based on a scrambling code of a corresponding multipath signal to be demodulated. A plurality of demodulation fingers 534, 538 and 542 each are initialized in response to a corresponding initialization command from the controller 510, and perform demodulation on the received signal in response to the demodulation finger operation signals from the demodulation finger operation signal generators 532, 536 and 540. The received signal indicates a valid multipath signal, and the scrambling operation includes an initialization operation on the scrambling code.

However, the above-stated general cell searcher sequentially searches all search targets from the first search target to the last search target in the first-step cell search process, second-step cell search process, third-step cell search process and multipath search process, instead of multi-searching all the search targets in a lump. That is, a CPU writes search parameters for the first search target in the cell searcher. Thereafter, the cell searcher informs the CPU of a completed search on the first search target. The CPU then reads the completed search result provided by the cell searcher. Thereafter, as described in conjunction with the first search target, even for the next search target, the CPU writes search parameters for the corresponding search target in the cell searcher. Thereafter, the cell searcher informs the CPU of a completed search on the corresponding search target. The CPU then reads the completed search result by the cell searcher. In this manner, the CPU repeatedly performs a write operation for cell search and/or a read operation for reading search results, each time a search on each of all the search targets is completed. However, since the CPU performs a plurality of software tasks while controlling the overall operation of a UE, the repetition of the write and read operations for a cell search serves as a heavy load in operation of the CPU.

SUMMARY OF THE INVENTION

It is, therefore, an object of the present invention to provide a cell search apparatus and method for supporting a multisearch function in a mobile communication system.

To achieve the above and other objects, the present invention provides an apparatus for performing a cell search on signals received from a plurality of Node Bs, wherein one frame of the signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame. The apparatus comprises a reference counter adapted to manage timings of the Node Bs, the timing being obtained by performing a first-step cell search on primary synchronization channel signals transmitted from the Node Bs; a frame boundary index storage adapted to store frame boundary indexes representing frame boundaries for the Node Bs, the frame boundaries are obtained by performing a second-step cell search on secondary synchronization channel signals received from the Node Bs; and a multisearch controller adapted to compare, upon receiving a third-step cell search start command, frame boundary timing of each of the frame boundary indexes to a current timing from the reference counter, perform third-step cell search on hypotheses corresponding to the frame boundary indexes at a next slot boundary following the current timing by using scrambling codes in a Node B code group obtained by the second-step cell search, and provide third-step cell search complete information after completing the third-step cell search on hypotheses corresponding to the frame boundary indexes.

To achieve the above and other objects, the present invention provides an apparatus for performing a cell search on signals received from a plurality of Node Bs, wherein one frame of the signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame The apparatus comprises a reference counter adapted to manage timings of the Node Bs, the timings being obtained by performing a first-step cell search on primary synchronization channel signals transmitted from the Node Bs; a first-step peak index storage adapted to store peak indexes representing slot boundaries for the Node Bs, the slot boundaries being obtained by the first-step cell search; and a multisearch controller adapted to compare, upon receiving a third-step cell search start command, slot boundary timing of each of the peak indexes to a current timing from the reference counter, perform a third-step cell search on hypotheses corresponding to the slot boundaries at a next slot boundary following the current timing by using scrambling codes existing in a neighboring cell list received from a system, and provid a third-step cell search complete information after completing the third-step cell search on hypotheses corresponding to the peak indexes.

To achieve the above and other objects, the present invention provides an apparatus for performing a multipath search on signals received from a plurality of Node Bs, wherein one frame of the signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame. The apparatus comprises a reference counter adapted to manage timings of the Node Bs, generated by detecting a first number of slot boundaries by performing a first-step cell search on primary synchronization channel signals transmitted from the Node Bs, detect a second number of frame boundaries by performing a second-step cell search on the first number of the slot boundaries, and detect scrambling codes for corresponding Node Bs by performing a third-step cell search on the second number of the frame boundaries; a frame boundary index storage adapted to store frame boundary indexes representing the frame boundaries; and a multisearch controller adapted to compare, upon receiving a multipath search start command, frame boundary timings corresponding to the detected frame boundary indexes to a current timing from the reference counter, perform multipath search on each of all hypotheses within a window by using scrambling codes detected by the third cell search at a point determined considering the current timing from the reference counter, the current slot boundary, and a window size previously determined for the multipath search when intending to start the multipath search at a particular timing while managing timing in a slot boundary unit, and provide a multipath search complete information after completing the multipath search on all the hypotheses.

To achieve the above and other objects, the present invention provides a method for performing a cell search on signals received from a plurality of Node Bs, wherein one frame of the signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame. The method comprises the steps of managing timings of the Node Bs, obtained by performing a first-step cell search on primary synchronization channel signals transmitted from the Node Bs; storing frame boundary indexes representing frame boundaries for the Node Bs, obtained by performing a second-step cell search on secondary synchronization channel signals received from the Node Bs; upon receiving a third-step cell search start command, comparing frame boundary timing of each of the frame boundary indexes to a current timing from a reference counter, determining a search start point as a next slot boundary by reading current timing from the reference counter while maintaining timing in a slot boundary unit, and waiting for the next slot boundary; and performing a third-step cell search on a hypothesis corresponding to the frame boundary at the next slot boundary by using scrambling codes in a Node B code group obtained by the second-step cell search, and providing a third-step cell search complete information after completing the third-step cell search on hypotheses corresponding to the frame boundary indexes.

To achieve the above and other objects, the present invention provides a method for performing a cell search on signals received from a plurality of Node Bs, wherein one frame of the signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame. The method comprises the steps of managing timings of the Node Bs, obtained by performing a first-step cell search on primary synchronization channel signals transmitted from the Node Bs; storing peak indexes representing slot boundaries for the Node Bs, obtained by the first-step cell search; upon receiving a third-step cell search start command, comparing slot boundary timing of each of the peak indexes to a current timing from a reference counter, determining as a search start point a slot boundary following the current timing at particular timing while managing timing in a slot boundary unit, and waiting for a next slot boundary; and performing a third-step cell search on a hypothesis corresponding to the slot boundary at a next slot boundary by using scrambling codes existing in a neighboring cell list received from a system, and providing a third-step cell search complete information after completing the third-step cell search on hypotheses corresponding to the first-step peak indexes.

To achieve the above and other objects, the present invention provides a method for performing a multipath search on signals received from a plurality of Node Bs, wherein one frame of the signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame. The method comprising the steps of managing timings of the Node Bs, generated by detecting a first number of slot boundaries by performing a first-step cell search on primary synchronization channel signals transmitted from the Node Bs, detecting a second number of frame boundaries by performing second-step cell search on the first number of the slot boundaries, and detecting scrambling codes for corresponding Node Bs by performing a third-step cell search on the second number of the frame boundaries; storing frame boundary indexes representing the frame boundaries; and upon receiving a multipath search start command, comparing frame boundary timings corresponding to the detected frame boundary indexes to a current timing from a reference counter, performing the multipath search on each of all hypotheses within a window by using scrambling codes detected by the third cell search at a point determined considering the slot boundary following the current timing and a window size previously determined for the multipath search at particular timing while managing timing in a slot boundary unit, and providing a multipath search complete information after completing the multipath search on all the hypotheses.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
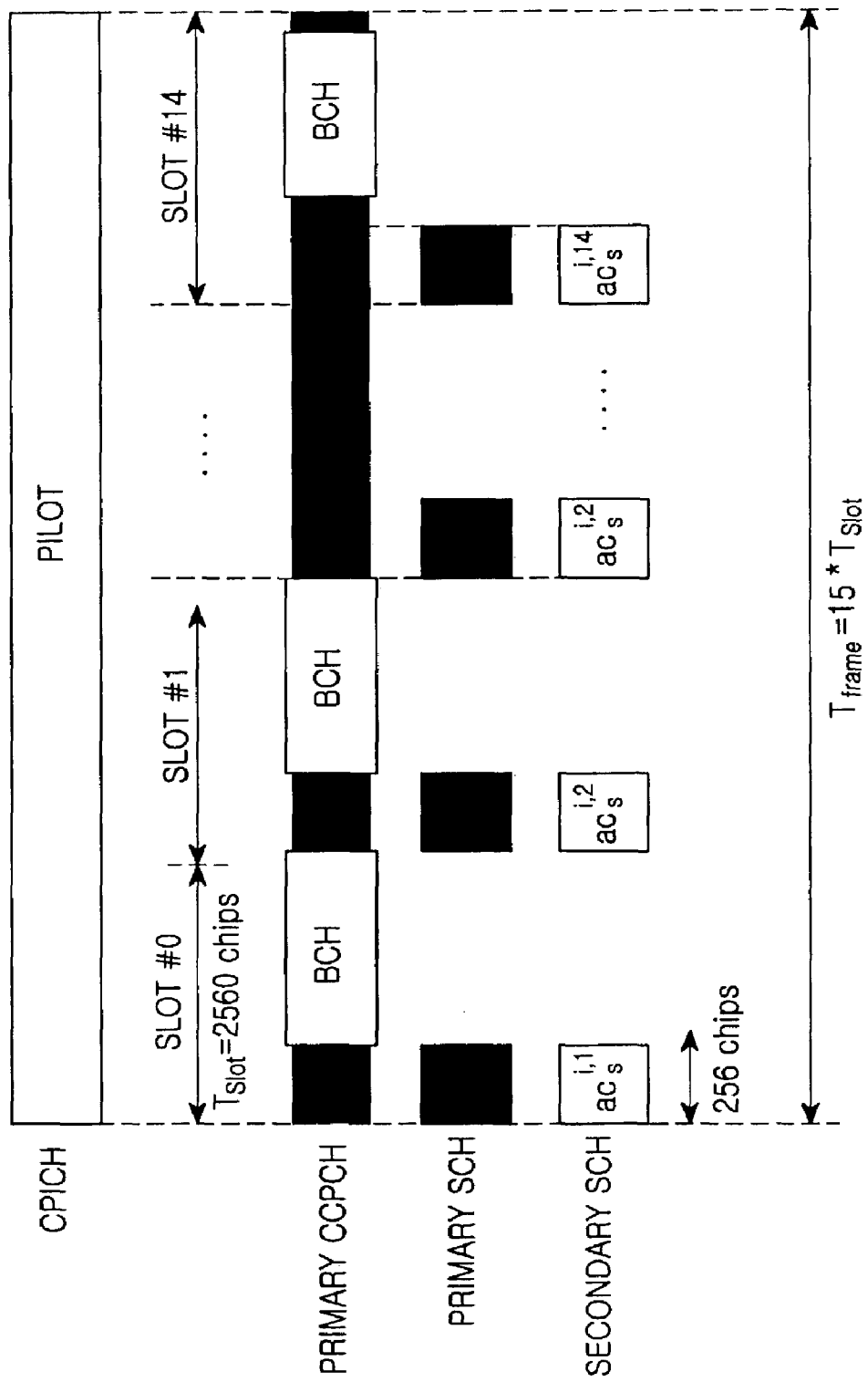
FIG. 1 illustrates an example of a structure of synchronization channels in a general W-CDMA mobile communication system.
Figure 2:
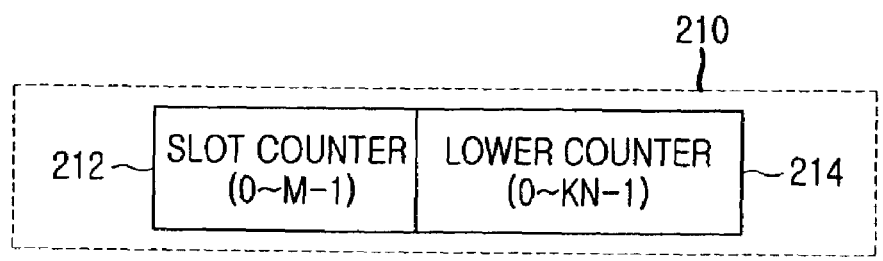
FIGS. 2 and 3 illustrate different examples of a general index counter.
Figure 3:
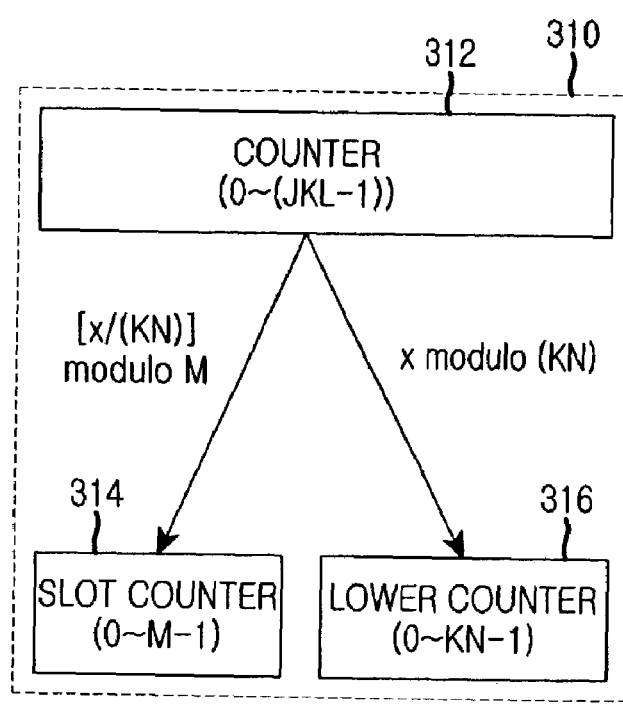
Figure 4:
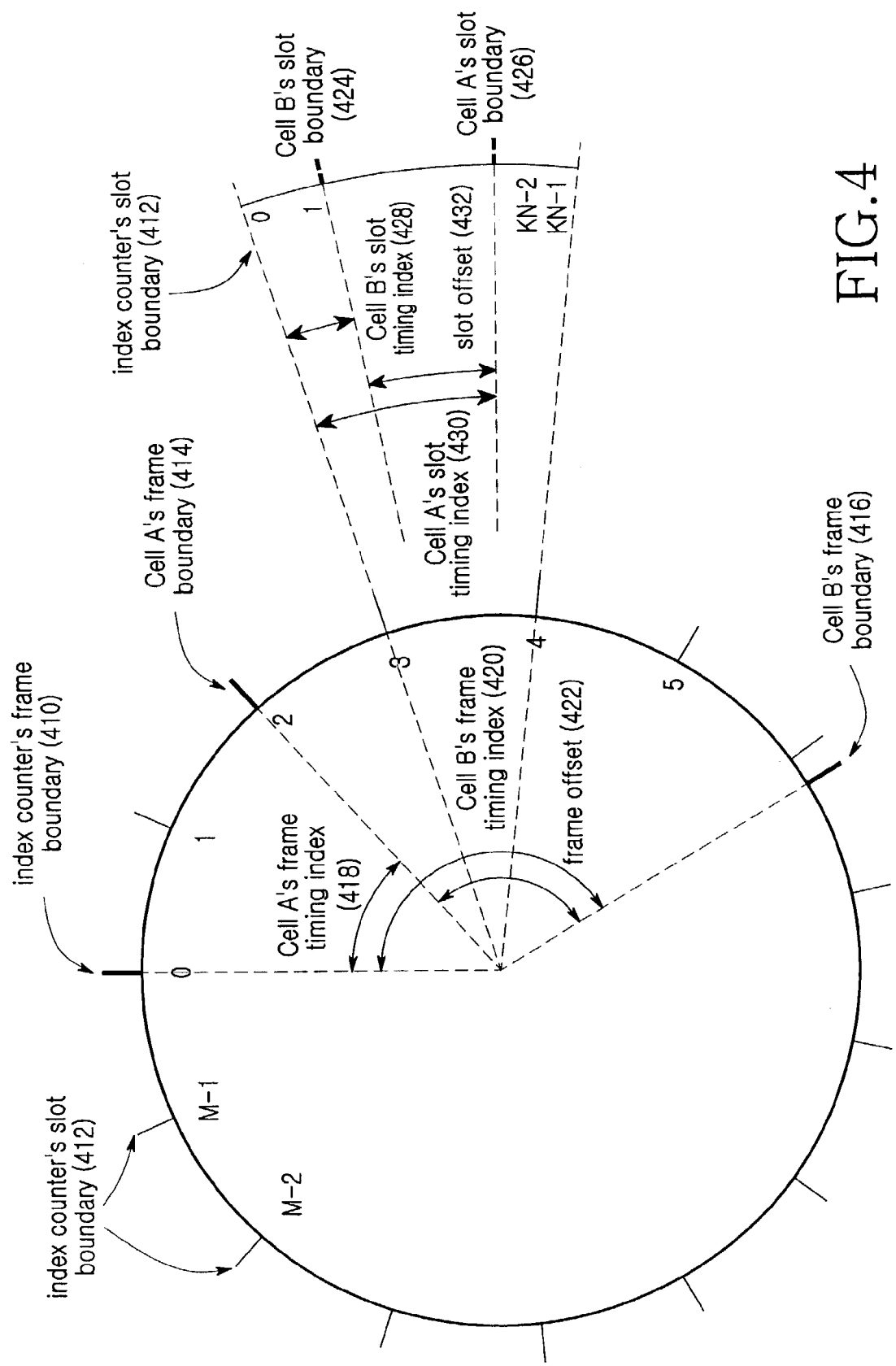
FIG. 4 illustrates an example of a timing relationship between an index counter and asynchronous cells.
Figure 5:
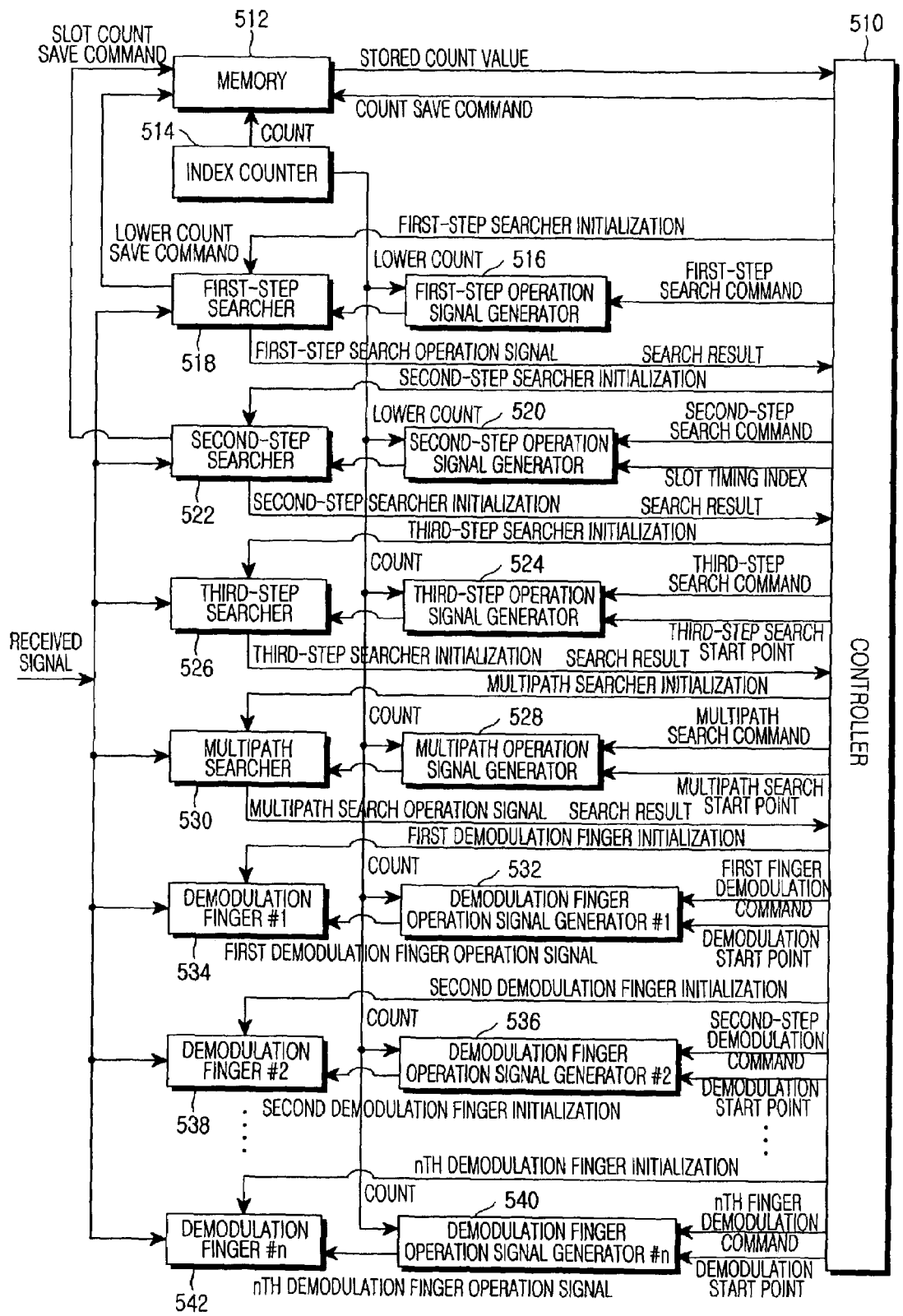
FIG. 5 illustrates an example of a cell search apparatus for a UE in a general W-CDMA mobile communication system.

Several embodiments of the present invention will now be described in detail with reference to the accompanying drawings. In the drawings, the same or similar elements are denoted by the same reference numerals. A detailed description of known functions and configurations have been omitted for conciseness.

A wideband-code division multiple access (W-CDMA) mobile communication system performs multistep cell search including first to third-step cell search processes. Herein, an initial cell search that is performed as a user equipment (UE) is powered on will not be considered in describing cell search. Since the initial cell search is not considered, the second-step cell search process is performed on all of N peak values searched in the first-step cell search process. In the first-step cell search process, a UE receives primary synchronization channel (P-SCH) signals transmitted from a plurality of Node Bs and searches for the slot timings of signals having an energy value larger than a predetermined threshold value from among the received signals having a peak value. If the number of P-SCH signals having a peak value larger than the threshold value among the N peak values is K, the second-step cell search process is performed to search for slot timings of the K P-SCH signals having the peak value.

In the second-step cell search process, the UE receives secondary synchronization channel (S-SCH) signals transmitted from Node Bs in accordance with the slot timings searched in the first-step cell search process, and detects frame synchronization and a Node B group to which the UE itself belongs. Likewise, even in the second-step cell search process, the UE receives the S-SCH signals in synchronously with the K slot timings and detects frame synchronization, i.e., frame boundary, for the signals having an energy value larger than a predetermined threshold value. If the number of signals having a peak value larger than the threshold value among the S-SCH signals that are synchronized with the K slot timings is M, the UE detects frame boundaries and Node B group codes for the M signals, and then performs a third-step cell search process in accordance with the detected M frame boundaries. In the third-step cell search step, the UE receives common pilot channel (CPICH) signals transmitted from Node Bs in accordance with the M frame boundaries and Node B group codes, i.e., Node B group information, detected in the second-step cell search process, and finally searches for its source Node B using a scrambling code for the corresponding Node B. Since M frame boundaries and Node B group information are detected in the second-step cell search process, the UE must finally determine, in the third-step cell search process, a scrambling code in use among the 8 scrambling codes corresponding to the Node B group, for one hypothesis.

Figure 6:
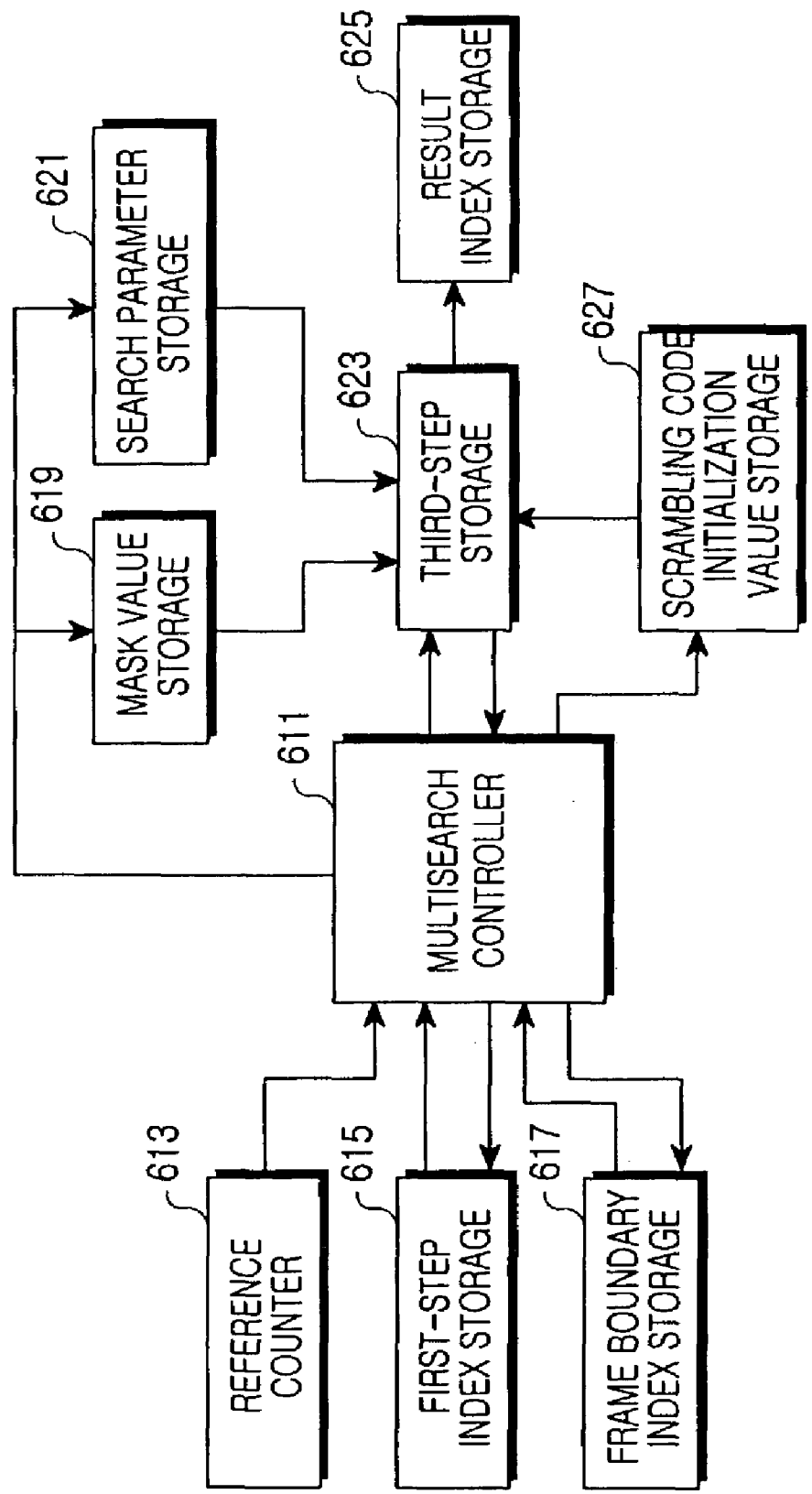
FIG. 6 is a block diagram illustrating an example of a structure of a cell searcher for supporting a multisearch function according to an embodiment of the present invention.

Now, with reference to FIG. 6, a description will made of an operation of the cell searcher in the case where the first-step cell search, second-step cell search and third-step cell search are sequentially performed. Herein, a cell search in which the first-step cell search, second-step cell search and third-step cell search are sequentially performed will be referred to as "first/second/third-step cell search."

FIG. 6 is a block diagram illustrating an example of a structure of a cell searcher for supporting a multisearch function according to an embodiment of the present invention. Referring to FIG. 6, in order to perform a multisearch operation in cell search without a central processing unit (CPU) (not shown) that manages software task scheduling for overall control of a UE, the UE first searches for a first-step peak index indicating K peak values detected in the first-step cell search. In the case of the first/second/third-step cell search, a peak index value searched in the first-step cell search is not stored in a first-step peak index storage 615. Further, in order to multisearch a third-step cell search for M hypotheses detected in the second-step cell search, the CPU stores frame boundary index for each of the M hypotheses in a frame boundary index storage 617, and stores an initial value of a first scrambling code in a Node B group to which the M hypotheses belong, in a scrambling code initial value storage 627. An initial value of a first scrambling code in the Node B group is stored because if an initial value of a first scrambling code belonging to a corresponding Node B group is given, it is possible to determine initial values of scrambling codes for other Node Bs in the corresponding Node B group. This is performed because initial values of other scrambling codes are set to values determined by applying predetermined unique offsets to the initial value of the first scrambling code. By storing only the initial value of the first scrambling code, it is possible to increase memory efficiency.

A reference counter 613, which is a counter for providing reference timing for scrambling code initialization, provides CPICH signal timing, i.e., scrambling code timing, received from a reference Node B by which the UE is currently serviced. The reference counter 613 counts scrambling code timing chip by chip, and is reset at periods of a time slot. Since the proposed cell search process is based on a slot boundary, a mask value storage 619 stores preferably only 15 mask values obtained by segmenting one radio frame by a time slot. A search parameter storage 621 stores search parameters for the cell search, such as the number of synchronization accumulations.

After storing all values for the cell search, the CPU provides a third-step cell search start command to a multisearch controller 611. The multisearch controller 611 is enabled in response to the third-step cell search start command. The multisearch controller 611, after being enabled, reads a first frame boundary index from the frame boundary index storage 617 in order to perform a third-step cell search on a first hypothesis among the M hypotheses. The multisearch controller 611 compares frame boundary timing information corresponding to the read first frame boundary index to the reference timing provided chip by chip from the reference counter 613 to check in a time slot unit a timing difference between a current position and a position corresponding to the first frame boundary index. Therefore, in order to perform the third-step cell search at the next time slot boundary, the multisearch controller 611 instructs the mask value storage 619 to write a mask value corresponding to the next time slot in a third-step cell searcher 623. Further, the multisearch controller 611 instructs the scrambling code initial value storage 627 to write a scrambling code initial value for each of the 8 Node Bs in a Node B group corresponding to the first hypothesis in the third-step cell searcher 623.

The third-step cell searcher 623 then performs a third-step cell search based on the mask value corresponding to the first hypothesis and the 8 scrambling code initial values, and provides to a result storage 625 a maximum correlation value among the correlation values for the 8 scrambling code initial values generated as a result of the third-step cell search, and a scrambling code index of a scrambling code initial value corresponding to the maximum correlation value. The result storage 625 then stores the maximum correlation value for the first hypothesis and the scrambling code initial value corresponding to the maximum correlation value, provided from the third-step cell searcher 623. In the same way, for the other hypothesis, the multisearch controller 611 writes a corresponding mask value and 8 scrambling code initial values in the corresponding Node B group in the third-step cell searcher 623, and the third-step cell searcher 623 then performs the third-step cell search based on the mask value and the 8 scrambling code initial values in the corresponding Node B group. When the third-step cell searcher 623 completes the cell search for each of the M hypotheses in this manner, the multisearch controller 611 provides a third-step cell search complete signal, or an interrupt signal, indicating completed cell search for the M hypotheses to the CPU. Upon receiving the interrupt signal provided from the multisearch controller 611, the CPU simultaneously reads the third-step cell search results stored in the result storage 625, thereby minimizing a load on the CPU.

Figure 7:
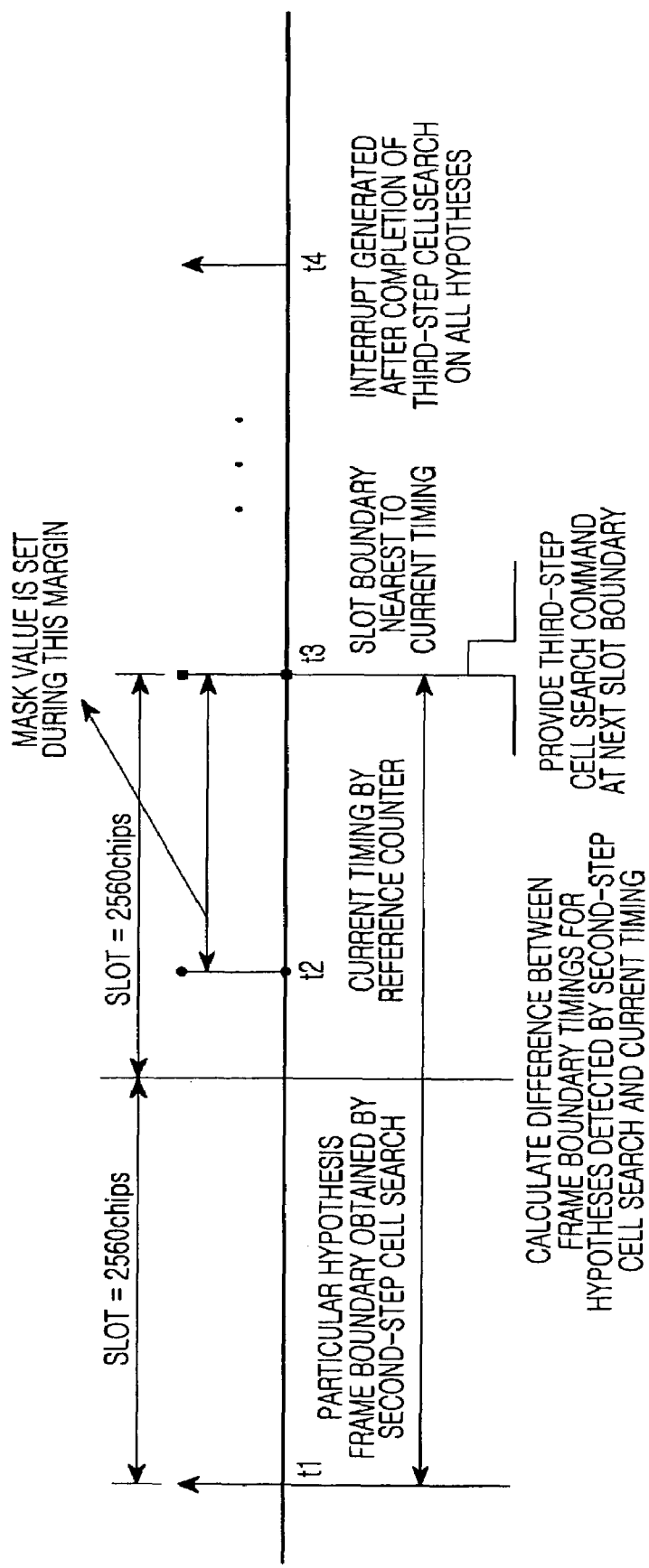
FIG. 7 is a diagram illustrating an example of an operation timing where the cell searcher of FIG. 6 performs a first/second/third-step cell search.

FIG. 7 is a diagram illustrating an example of operation timing where the cell searcher of FIG. 6 performs a first/second/third-step cell search according to an embodiment of the invention. The cell searcher described in conjunction with FIG. 6 performs third-step cell search on M hypotheses stored in the frame boundary index storage 617, i.e., frame boundaries detected in the second-step cell search process. Operation timing where the third-step cell search is performed on a particular hypothesis among the M hypotheses will be described below with reference to FIG. 7.

If the CPU provides a third-step cell search start command to the multisearch controller 611, the multisearch controller 611 is enabled in response to the third-step cell search command. The multisearch controller 611, after being enabled, compares frame boundary timing corresponding to a particular frame boundary index among M frame boundary indexes with current reference timing provided from the reference counter 613. In FIG. 7, the frame boundary timing corresponding to the particular frame boundary index is represented by t1, and the current reference timing provided from the reference counter 613 is represented by t2. For example, as a result of reading reference timing from the reference counter 613 in order to start the search while checking the timing slot by slot on the basis of the frame boundary timing t1, the multisearch controller 611 determines that the current timing is t2. Therefore, the multisearch controller 611 determines to start the search at timing t3, detecting that the next slot boundary nearest to the time point t2 is t3. In this case, the multisearch controller 611 instructs the mask value storage 619 to set a mask value corresponding to the slot boundary t3 while waiting for the slot boundary t3 nearest to the point t2. Accordingly, at the slot boundary t3, the multisearch controller 611 provides a third-step cell search command for the particular hypothesis to the third-step cell searcher 623, and the third-step cell searcher 623 then performs the third-step cell search on the particular hypothesis. When the third-step cell search is completed on all the M hypotheses in this manner, the multisearch controller 611 provides an interrupt signal indicating completion of the third-step cell search to the CPU at a timing point t4 where the third-step cell search has been completed.

Next, an operation of the cell searcher in the case where only the first-step cell search and the third-step cell search are performed will be described below with reference to FIG. 6. Herein, a cell search in which the third-step cell search is performed immediately after the first cell search will be referred to as a "first/third-step cell search." Since the first/third-step cell search occurs in the case where a neighboring cell list is given, all scrambling codes existing in the neighboring cell list must be stored in order to normally perform the cell search. In the present invention, it will be assumed that a maximum of 32 neighboring cells exist in the neighboring cell list. Corresponding initial values must be stored in the scrambling code initial value storage 627. Assuming that the third-step cell searcher 623 includes 16 correlators therein, when first setting initial parameters, the third-step cell searcher 623 can set 16 scrambling code initial values. After completing the search on these values, the third-step cell searcher 623 sets the remaining 16 scrambling code initial values, and then completes the search on a particular slot boundary. The first/third-step cell search must preferably perform a hypothesis test on 15 slot boundaries in order to detect a frame boundary for K peak values larger than a predetermined threshold value, i.e., K hypotheses, detected in the first-step cell search.

That is, as described above, the CPU stores the scrambling code initial values in the scrambling code initial value storage 627, and also stores first-step peak indexes representing the K peak values in the first-step peak index storage 615. When performing the first/third-step cell search, the cell searcher of FIG. 6 does not store separate frame boundary indexes in the frame boundary index storage 617. After storing all the values for the first/third-step cell search, the CPU provides a third-step cell search start command to the multisearch controller 611, and the multisearch controller 611 is enabled in response to the third-step cell search start command. The multisearch controller 611, as it is enabled, receives reference timing provided from the reference counter 613 and gives a test in a first peak index, i.e., a first hypothesis, among K peak indexes stored in the first-step peak index storage 615. The multisearch controller 611 compares a slot boundary corresponding to the read first peak index with reference timing provided from the reference counter 613, and determines a timing difference between a current position and a position corresponding to the first slot boundary index by a time slot. In order to perform the third-step cell search at the next time slot boundary, the multisearch controller 611 instructs the mask value controller 619 to write a mask value corresponding to the first slot boundary in the third-step cell searcher 623 at the next time slot. Further, the multisearch controller 611 instructs the scrambling code initial value storage 627 to first write the 16 scrambling code initial values among the stored initial values in the third-step cell searcher 623. Thereafter, the multisearch controller 611 performs the search on the first slot boundary in the same way using the remaining 16 scrambling codes. In this case, it is necessary to memorize a value of a slot counter in a reference counter for a position where the initial search is started. This value is recorded in the result storage 625. Therefore, when performing the search on the first slot boundary at a particular time, it is necessary to check how many slots have elapsed from an initial search point and to read a corresponding mask value from the mask value storage 619. The 15 slot boundaries should be checked for all the cases where a phase difference between a reference slot where the initial search is started and each of the slot boundaries becomes 0 to 14 slots. A mask value must be read considering the phase difference.

The reason for checking the phase difference is to determine a position where the peak value searched in the first-step cell search is located among the 15 slot boundaries.

The third-step cell searcher 623 then performs the third-step cell search, using the mask value corresponding to the first hypothesis and the 32 scrambling code initial values. The third-step cell searcher 623 checks a slot boundary for each of the 32 scrambling code initial values for the first hypothesis, and as a result of the check, provides the result storage 625 with a maximum correlation value among correlation values for each of the 32 scrambling code initial values, a scrambling code index of a scrambling code corresponding to the maximum correlation value, and a slot boundary index, including a slot boundary value at a search start point. The result storage 625 then stores the maximum correlation value for the first hypothesis, the scrambling code index corresponding to the maximum correlation value, and the slot boundary value at a search start point, provided from the third-step cell searcher 623. Likewise, for each of the remaining hypotheses, the multisearch controller 611 writes a corresponding mask value and 32 scrambling code initial values in the third-step cell searcher 623, and the third-step cell searcher 623 performs the third-step cell search, using the mask value and the 32 scrambling code initial values. When the third-step cell searcher 623 completes the search on each of the K hypotheses in this manner, the multisearch controller 611 provides the CPU with a third-step cell search complete signal, or an interrupt signal, indicating a completed third-step cell search on the M hypotheses. Upon receiving the interrupt signal provided from the multisearch controller 611, the CPU simultaneously reads the third-step cell search results stored in the result storage 625, thereby minimizing a load on the CPU.

Figure 8:
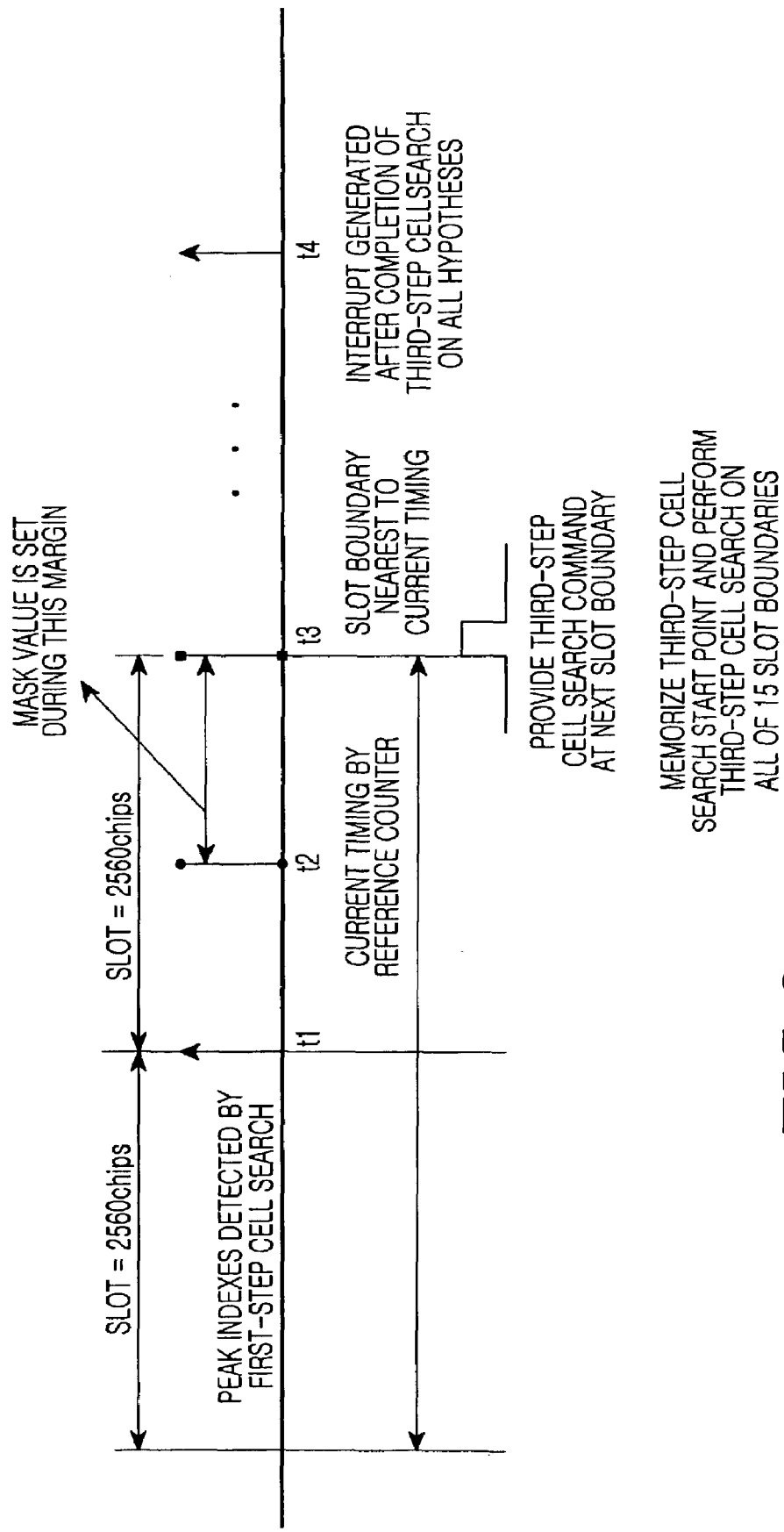
FIG. 8 is a diagram illustrating an example of an operation timing where the cell searcher of FIG. 6 performs first/third-step cell search.

FIG. 8 is a diagram illustrating an example of an operation timing where the cell searcher of FIG. 6 performs first/third-step cell search according to an embodiment of the invention. The first/third-step cell searcher of FIG. 6 performs the third-step cell search on K hypotheses stored in the first-step peak index storage 615, i.e., slot boundaries detected in the first-step cell search process. Operation timing where the third-step cell search is performed on a particular hypothesis among the K hypotheses will be described below with reference to FIG. 8.

Upon receiving a third-step cell search start command from the CPU, the multisearch controller 611 is enabled in response to the received third-step cell search start command. The multisearch controller 611 then compares slot boundary timing corresponding to a particular peak index among K peak indexes stored in the first-step peak index storage 615 with current timing provided from the reference counter 613. In FIG. 8, the slot boundary timing corresponding to the particular peak index is represented by t1, and the current timing provided from the reference counter 613 is represented by t2. For example, while managing the slot boundary timing on the basis of the slot boundary timing t1, the multisearch controller 611 detects reference timing from the reference counter 613 at time t2, and then waits for a slot boundary t3 nearest to the current timing t2. The multisearch controller 611, while waiting for the slot boundary t3 nearest to the current timing t2, instructs the mask value storage 619 to set a mask value corresponding to the slot boundary t3. Accordingly, at the slot boundary t3, the multisearch controller 611 provides a third-step cell search command for the particular hypothesis to the third-step cell searcher 623, and the third-step cell searcher 623 then performs the third-step cell search on the particular hypothesis. The multisearch controller 611 memorizes a position where the third-step cell search was started, i.e., a slot boundary, and checks all of 15 possible slot boundaries in order to determine how far the slot boundary is distanced from the frame boundary. When the third-step cell search has been completed on all of the M hypotheses in this manner, the multisearch controller 611 provides an interrupt signal indicating completion of the third-step cell search to the CPU at a timing point t4 where the third-step cell search has been completed.

Next, an operation of a cell searcher in the case where only multipath search is performed will be described with reference to FIG. 9.

Figure 9:
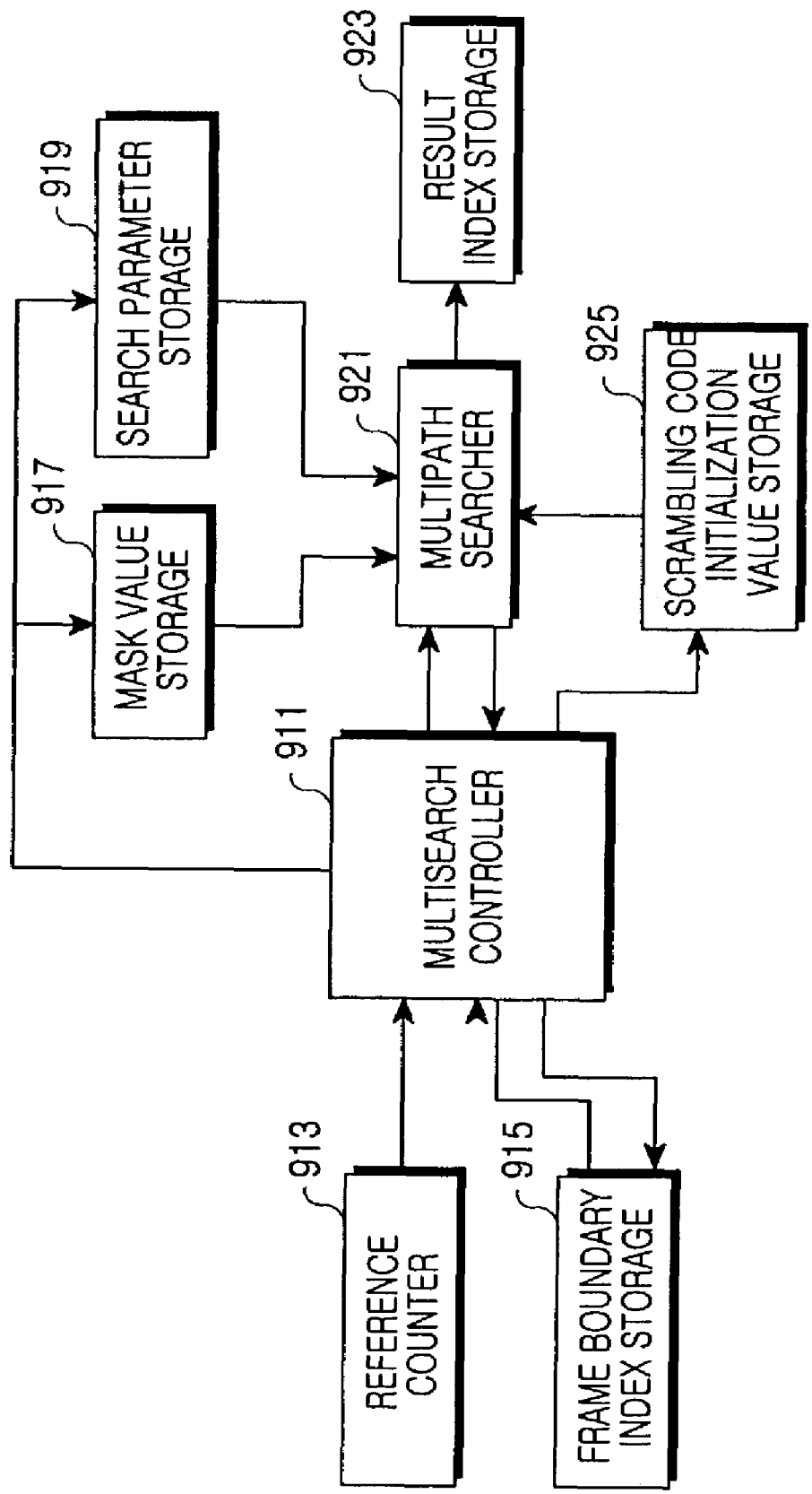
FIG. 9 is a block diagram illustrating an example of a structure of a cell searcher for supporting a multisearch function according to another embodiment of the present invention.

FIG. 9 is a block diagram illustrating an example of a structure of a cell searcher for supporting a multisearch function according to another embodiment of the present invention. The term "multipath search" means a search, which is performed on an active set or Node Bs having equivalent energy in the active set. That is, the cell searcher performs the search on neighboring Node Bs in the third-step cell search, determines Node Bs having energy sufficient to participate in modulating a signal received from a UE among the neighboring Node Bs, and then delivers signals received from the determined Node Bs to a multipath searcher, for demodulation. It will be assumed herein that the multipath searcher is comprised of 8 fingers. The searcher for multipath search also operates in a similar way to the searcher described in conjunction with FIG. 6.

Referring to FIG. 9, in order to perform a multipath search on L hypotheses detected in third-step cell search after completion of initial cell search, a CPU (not shown) stores a frame boundary index for each of the L hypotheses in a frame boundary index storage 915, and also stores an initial value of a scrambling code for a Node B, to which the L hypotheses belong, in a scrambling code initial value storage 925. A reference counter 913 manages timings of a plurality of Node Bs. Since the proposed cell search process is based on a slot boundary, a mask value storage 917 stores only 15 mask values obtained by segmenting one ratio frame by a time slot. A search parameter storage 919 stores search parameters for the cell search, i.e., stores search parameters such as a search window size.

After storing all the values for the cell search, the CPU provides a multipath search start command to a multisearch controller 911, and the multisearch controller 911 is enabled in response to the multipath search start command. The multisearch controller 911, after being enabled, reads a first frame boundary index from the frame boundary index storage 915 in order to perform the multipath search on a first hypothesis among the L hypotheses. The multisearch controller 911 compares frame boundary timing corresponding to the detected first frame boundary index with reference timing provided chip by chip from the reference counter 913 to check in a time slot unit a timing difference between a current position and a position corresponding to the first frame boundary index.

Here, the multisearch controller 911 calculates a difference between the frame boundary timing t1 and the current timing t2, and the calculated difference is used in setting a multipath search start point and a corresponding scrambling code mask value. Further, the multisearch controller 911 usually performs multipath search at time t3=2,560*k−W/2+7, considering a window search at the next slot boundary and operation of an 8× searcher. The "8× searcher" is a hardware searcher designed to be 8 times faster in speed than a 1× searcher. In addition, "k" denotes a slot index representing a corresponding slot, and "W" denotes a window size. The multisearch controller 911 instructs the mask value storage 917 to write a mask value corresponding to the slot index in a multipath searcher 921, and instructs the scrambling code initial value storage 925 to write a scrambling code initial value corresponding to the first hypothesis in the multipath searcher 921. The multipath searcher 921 then performs the multipath search, using the mask value corresponding to the first hypothesis and the scrambling code initial value corresponding to the hypothesis, and provides a result storage 923 with a maximum correlation value among correlation values generated as a result of the multipath search and an index corresponding to the maximum correlation value. The result storage 923 then stores the maximum correlation value for the first hypothesis and the scrambling code index representing a scrambling code initial value corresponding to the maximum correlation value, provided from the multipath searcher 921. Likewise, for each of the remaining hypotheses, the multisearch controller 911 writes the corresponding mask values and scrambling code initial values for the corresponding hypotheses in the multipath searcher 921, and the multipath searcher 921 performs the multipath search, using the mask values and the scrambling code initial values for corresponding Node Bs. When the multipath searcher 921 completes search on each of the L hypotheses in this manner, the multisearch controller 911 provides the CPU with a multipath search complete signal, or an interrupt signal, indicating completed multipath search on the L hypotheses. Upon receiving the interrupt signal provided from the multisearch controller 911, the CPU simultaneously reads the multipath search results stored in the result storage 923, thereby minimizing a load on the CPU.

Figure 10:
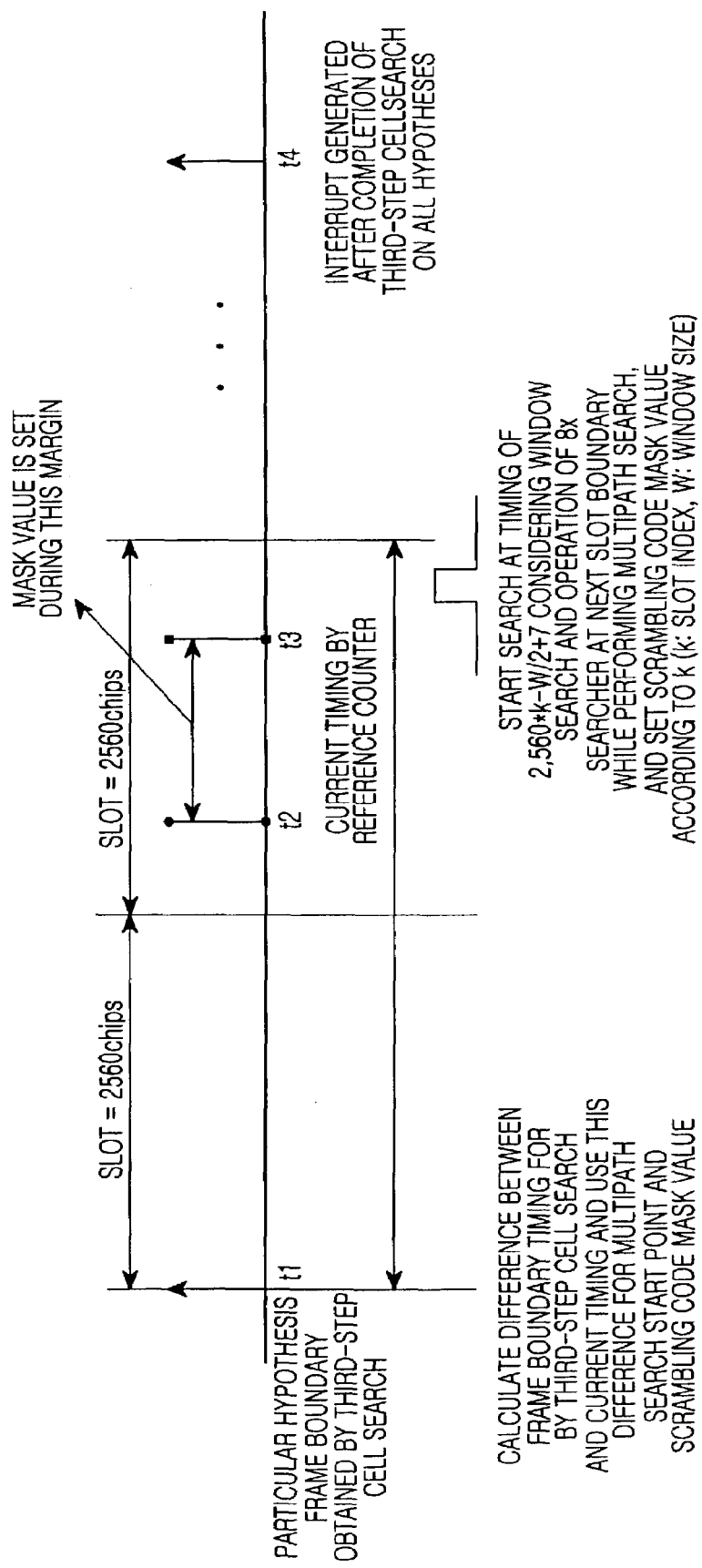
FIG. 10 is a diagram illustrating an example of an operation timing where a cell searcher of FIG. 9 performs multipath search according to another embodiment of the present invention.

FIG. 10 is a diagram illustrating an example of an operation timing where a cell searcher of FIG. 9 performs a multipath search according to another embodiment of the present invention. The multipath searcher described in conjunction with FIG. 9 performs the multipath search on a frame boundary corresponding to a particular frame index among L frame indexes stored in the frame boundary index storage 915. The frame boundary indexes stored in the frame boundary index storage 915 correspond to the results detected in the third-step cell search. Therefore, operation timing where the third-step cell search is performed on a particular hypothesis among the L hypotheses will be described below with reference to FIG. 10.

Upon receiving a multipath search start command from the CPU, the multisearch controller 911 is enabled in response to the received multipath search start command. The multisearch controller 911 then compares frame boundary timing corresponding to a particular frame boundary index among the L frame boundary indexes stored in the frame boundary index storage 915 with current reference timing provided from the reference counter 913. In FIG. 10, the frame boundary timing corresponding to the particular frame boundary index is represented by t1, and the current timing provided from the reference counter 913 is represented by t2. The multisearch controller 911 calculates a difference between the frame boundary timing t1 and the current reference timing t2, and the calculated difference is used in setting a multipath search start point and a corresponding scrambling code mask value. Further, the multisearch controller 911 usually performs the multipath search at time t3=2,560*k−W/2+7, considering window search at the next slot boundary and operations of 8 searchers. Here, "k" denotes a slot index representing a corresponding slot, and "W" denotes a window size. At time t3, the multisearch controller 911 provides the multipath searcher 921 with a multipath search command for the particular hypothesis, and the multipath searcher 921 then performs the multipath search on the particular hypothesis. When the multipath search has been completely performed on the L hypotheses in this manner, the multisearch controller 911 provides an interrupt signal indicating completion of the multipath search to the CPU at time t4 where the multipath search has been completed.

As described above, the present invention provides a multisearch function of collectively handling parameters related to all search targets during cell search in a W-CDMA mobile communication system. Due to the multisearch function, a CPU of a UE can read cell search results at a time without separately performing a plurality of write and read operations for cell search, contributing to minimization in a CPU load.

While the invention has been shown and described with reference to a certain embodiments thereof, it will be understood by those skilled in the art that various changes in form and details may be made therein without departing from the spirit and scope of the invention as defined by the appended claims.

What is claimed is:

1. An apparatus for performing a cell search on signals received from a plurality of Node Bs, wherein one frame of said signal includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame, the apparatus comprising:
    a reference counter, adapted to manage timing for the Node Bs, said timing being obtained by performing a first-step cell search on primary synchronization channel signals transmitted from the Node Bs;
    a frame boundary index storage, adapted to store frame boundary indexes representing frame boundaries for the Node Bs, said frame boundaries being obtained by performing second-step cell search on secondary synchronization channel signals received from the Node Bs; and
    a multisearch controller, adapted to
    compare, upon receiving a third-step cell search start command, frame boundary timing of each of the frame boundary indexes to a current timing from the reference counter;
    perform a third-step cell search on hypotheses corresponding to the frame boundary indexes at a next slot boundary following the current timing by using scrambling codes in a Node B code group obtained by the second-step cell search; and
    provide a third-step cell search complete information after completing the third-step cell search on hypotheses corresponding to the frame boundary indexes.

2. The apparatus of claim 1, further comprising:
    a mask value storage, adapted to store mask values representing the slots.

3. The apparatus of claim 2, wherein the multisearch controller is further adapted to perform the third-step cell search while shifting scrambling codes in the Node B code group by a slot, by defining the mask values as mask values of slot boundaries.

4. The apparatus of claim 1, further comprising:
    a third-step cell searcher, adapted to perform third-step cell search on the hypotheses under the control of the multisearch controller; and
    a result storage, adapted to store a scrambling code index corresponding to a scrambling code having a maximum correlation value obtained by performing the third-step cell search on each of the hypotheses.

5. The apparatus of claim 1, further comprising:
    a central processing unit, adapted to generate the third-step cell search start command, and read scrambling code indexes for the hypotheses upon receiving the third-step cell search complete information.

6. An apparatus for performing a cell search on signals received from a plurality of Node Bs, wherein one frame of said signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame, the apparatus comprising:
    a reference counter, adapted to manage timings of the Node Bs, said timings being obtained by performing a first-step cell search on primary synchronization channel signals transmitted from the Node Bs;
    a first-step peak index storage, adapted to store peak indexes representing slot boundaries for the Node Bs, said slot boundaries being obtained by the first-step cell search; and
    a multisearch controller, adapted to
    compare, upon receiving a third-step cell search start command, slot boundary timing of each of the peak indexes with current timing from the reference counter;
    perform a third-step cell search on hypotheses corresponding to the slot boundaries at a next slot boundary following the current timing by using scrambling codes existing in a neighboring cell list received from a system; and
    provide a third-step cell search complete information after completing the third-step cell search on hypotheses corresponding to the peak indexes.

7. The apparatus of claim 6, further comprising:
    a mask value storage, adapted to store mask values representing the slots.

8. The apparatus of claim 7, wherein the multisearch controller is further adapted to perform the third-step cell search while shifting scrambling codes existing in the neighboring cell list by a slot, by defining the mask values as mask values of slot boundaries.

9. The apparatus of claim 6, further comprising:
    a third-step cell searcher, adapted to performing the third-step cell search on the hypotheses under the control of the multisearch controller; and
    a result storage, adapted to store a scrambling code index corresponding to a scrambling code having a maximum correlation value obtained by performing the third-step cell search on each of the hypotheses, a slot boundary index at a search start point, and a slot boundary index at a point having the maximum correlation value.

10. The apparatus of claim 6, further comprising:
    a central processing unit, adapted to generate the third-step cell search start command, and read scrambling code indexes for the hypotheses upon receiving the third-step cell search complete information.

11. An apparatus for performing a multipath search on signals received from a plurality of Node Bs, wherein one frame of said signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame, the apparatus comprising:

a reference counter, adapted to manage timings of the Node Bs, generated by detecting a first number of slot boundaries by performing a first-step cell search on primary synchronization channel signals transmitted from the Node Bs;

detect a second number of frame boundaries by performing a second-step cell search on the first number of the slot boundaries; and detect scrambling codes for corresponding Node Bs by performing a third-step cell search on the second number of the frame boundaries;

a frame boundary index storage, adapted to store frame boundary indexes representing the frame boundaries; and a multisearch controller, adapted to compare, upon receiving a multipath search start command, frame boundary timings corresponding to the detected frame boundary indexes to a current timing from the reference counter;

perform the multipath search on each of all hypotheses within a window by using scrambling codes detected by the third cell search at a point determined considering the current timing from the reference counter, the current slot boundary, and a window size previously determined for the multipath search when intending to start the multipath search at a particular timing while managing timing in a slot boundary unit; and provide a multipath search complete information after completing the multipath search on all the hypotheses.

12. The apparatus of claim 11, further comprising:
a mask value storage, adapted to store mask values representing the slots.

13. The apparatus of claim 11, further comprising:
a central processing unit, adapted to generate the multipath search start command, and read scrambling code indexes for the hypotheses upon receiving the multipath search complete information.

14. A method for performing a cell search on signals received from a plurality of Node Bs, wherein one frame of said signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame, the method comprising the steps of:

managing timings of the Node Bs, obtained by performing a first-step cell search on primary synchronization channel signals transmitted from the Node Bs;

storing frame boundary indexes representing frame boundaries for the Node Bs, obtained by performing a second-step cell search on secondary synchronization channel signals received from the Node Bs;

upon receiving a third-step cell search start command, comparing frame boundary timing of each of the frame boundary indexes to a current timing from a reference counter, determining a search start point as a next slot boundary by reading current timing from the reference counter while maintaining timing in a slot boundary unit, and waiting for the next slot boundary; and performing a third-step cell search on a hypothesis corresponding to the frame boundary at the next slot boundary by using scrambling codes in a Node B code group obtained by the second-step cell search, and providing a third-step cell search complete information after completing the third-step cell search on hypotheses corresponding to the frame boundary indexes.

15. The method of claim 14, wherein the third-step cell search is performed while shifting scrambling codes in the Node B code group by a slot, by defining the mask values representing the slots as mask values of slot boundaries.

16. A method for performing a cell search on signals received from a plurality of Node Bs, wherein one frame of said signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame, the method comprising the steps of:

managing timings of the Node Bs, obtained by performing a first-step cell search on primary synchronization channel signals transmitted from the Node Bs;

storing peak indexes representing slot boundaries for the Node Bs, obtained by the first-step cell search;

upon receiving a third-step cell search start command, comparing slot boundary timing of each of the peak indexes to a current timing from a reference counter, determining as a search start point a slot boundary following the current timing at particular timing while managing timing in a slot boundary unit, and waiting for a next slot boundary; and performing third-step cell search on a hypothesis corresponding to the slot boundary at a next slot boundary by using scrambling codes existing in a neighboring cell list received from a system, and providing a third-step cell search complete information after completing the third-step cell search on hypotheses corresponding to the first-step peak indexes.

17. The method of claim 16, wherein the third-step cell search is performed while shifting scrambling codes in the Node B code group by a slot, by defining the mask values representing the slots as mask values of slot boundaries.

18. A method for performing a multipath search on signals received from a plurality of Node Bs, wherein one frame of said signals includes a predetermined number of slots having a predetermined chip length, and each of the Node Bs transmits a primary synchronization channel at a beginning part of each slot by a predetermined chip length, a secondary synchronization channel overlapping with the primary synchronization channel while maintaining orthogonality with the primary synchronization channel, and a common pilot channel scrambled with a unique scrambling code, a period of the scrambling code being identical to a length of one frame, the method comprising steps of:
- managing timings of the Node Bs, generated by detecting a first number of slot boundaries by performing a first-step cell search on primary synchronization channel signals transmitted from the Node Bs, detecting a second number of frame boundaries by performing a second-step cell search on the first number of the slot boundaries, and detecting scrambling codes for corresponding Node Bs by performing a third-step cell search on the second number of the frame boundaries;
- storing frame boundary indexes representing the frame boundaries; and
- upon receiving a multipath search start command, comparing frame boundary timings corresponding to the detected frame boundary indexes to a current timing from a reference counter, performing the multipath search on each of all hypotheses within a window by using scrambling codes detected by the third cell search at a point determined considering the slot boundary following the current timing and a window size previously determined for the multipath search at particular timing while managing timing in a slot boundary unit, and providing multipath search complete information after completing the multipath search on all the hypotheses.

* * * * *